US011858566B2

(12) United States Patent
Kalmes et al.

(10) Patent No.: US 11,858,566 B2
(45) Date of Patent: Jan. 2, 2024

(54) TRACK LINK HAVING SENSOR-RECEIVING CAVITIES

(71) Applicants: Caterpillar Inc., Peoria, IL (US); AsiaTrak(Tianjin) Ltd., Tianjin (CN)

(72) Inventors: Donald J. Kalmes, Peoria, IL (US); William P. Shoemaker, Peoria, IL (US); Yaodong Zhou, Tianjin (CN); Li Zhang, Dunlap, IL (US)

(73) Assignees: Caterpillar Inc., Peoria, IL (US); AsiaTrak (Tianjin) Ltd., Tianjin (CN)

(*) Notice: Subject to any disclaimer, the term of this patent is extended or adjusted under 35 U.S.C. 154(b) by 259 days.

(21) Appl. No.: 17/443,520

(22) Filed: Jul. 27, 2021

(65) Prior Publication Data

US 2023/0032368 A1 Feb. 2, 2023

(51) Int. Cl.
*B62D 55/21* (2006.01)
(52) U.S. Cl.
CPC .................. *B62D 55/21* (2013.01)
(58) Field of Classification Search
CPC ...... B62D 55/20; B62D 55/205; B62D 55/21; B62D 55/32
See application file for complete search history.

(56) References Cited

U.S. PATENT DOCUMENTS

| 2,168,053 | A | * | 8/1939 | Starr | B62D 55/28 305/113 |
|---|---|---|---|---|---|
| 5,749,635 | A | | 5/1998 | Umbarger | |
| 9,475,526 | B2 | | 10/2016 | McKinley et al. | |
| 10,401,315 | B2 | | 9/2019 | Baarman et al. | |
| 2008/0179946 | A1 | | 7/2008 | Oertley | |
| 2011/0163595 | A1 | | 7/2011 | Kirchmair et al. | |
| 2015/0066291 | A1 | * | 3/2015 | Johannsen | B62D 55/32 701/34.4 |
| 2015/0337522 | A1 | | 11/2015 | Diekevers et al. | |
| 2016/0131544 | A1 | * | 5/2016 | Rust | G01M 13/023 73/8 |
| 2016/0178483 | A1 | * | 6/2016 | Sidles | E02F 9/26 73/146 |
| 2018/0050385 | A1 | * | 2/2018 | Wang | B21J 5/027 |
| 2020/0070906 | A1 | * | 3/2020 | Laperle | B62D 55/244 |
| 2021/0088416 | A1 | * | 3/2021 | Grenzi | B62D 55/32 |

* cited by examiner

*Primary Examiner* — S. Joseph Morano
*Assistant Examiner* — Emily G. Castonguay

(57) ABSTRACT

A track link having sensor-receiving cavities and a method of producing a track link is disclosed. The track link may include a link body and a cavity formed in the link body configured to receive a sensing device. The track link may also include a protrusion substantially surrounding the cavity. The protrusion may include a substantially flat surface.

20 Claims, 4 Drawing Sheets

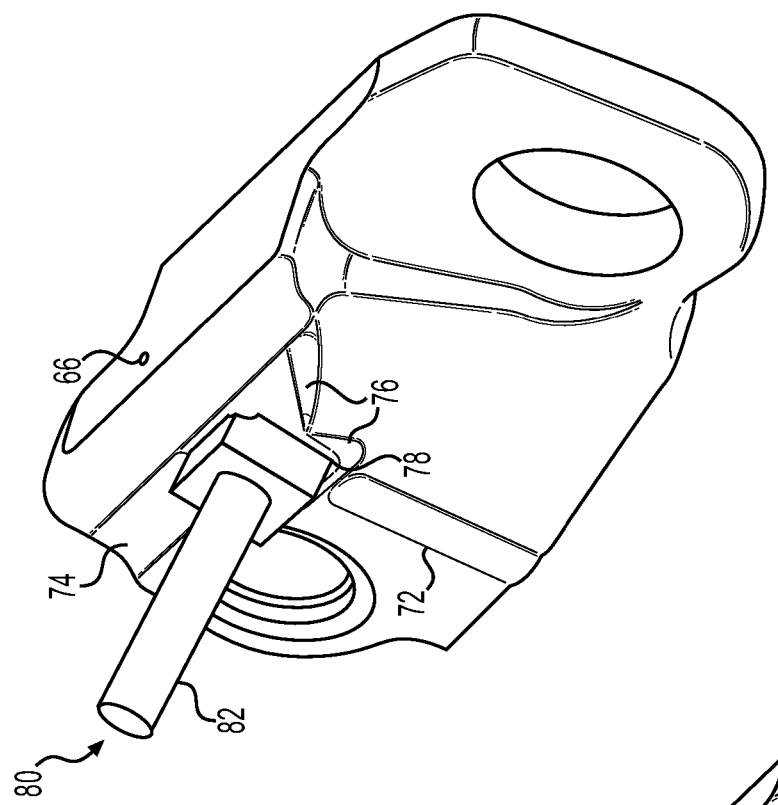
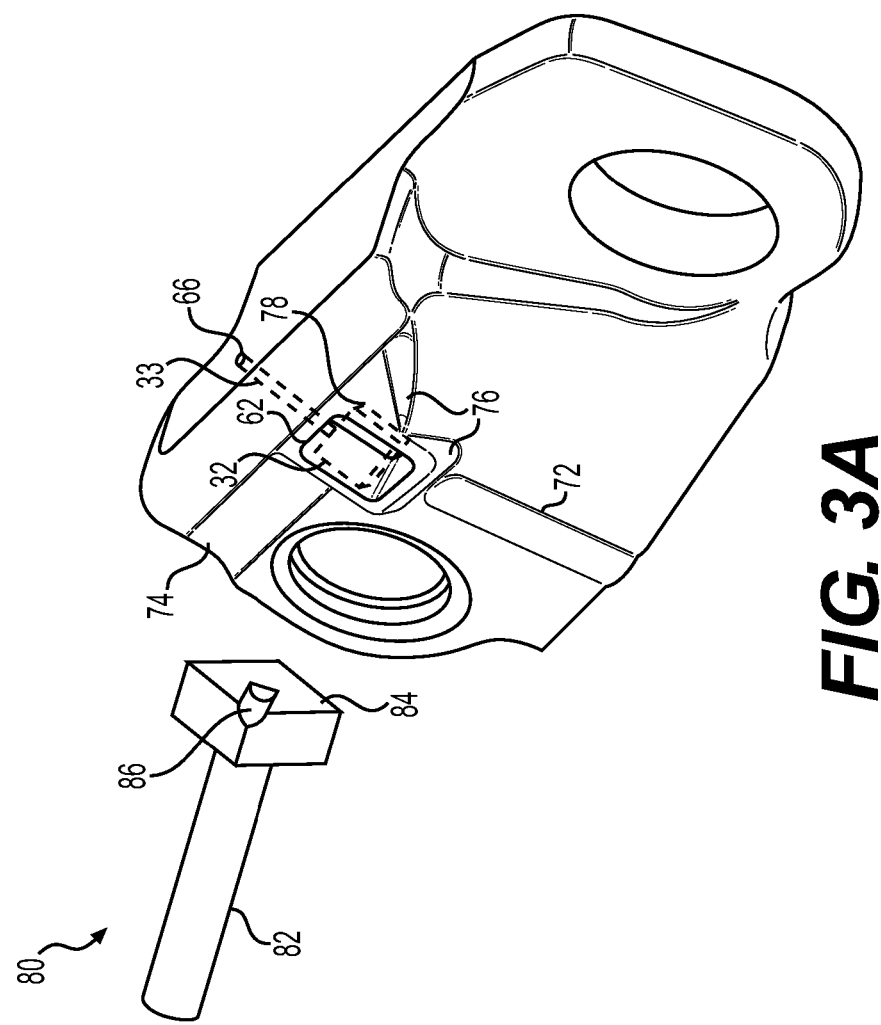
FIG. 3B
FIG. 3A

TRACK LINK HAVING SENSOR-RECEIVING CAVITIES

TECHNICAL FIELD

The present disclosure relates generally to track assemblies for machines, and more particularly, to a track link having sensor-receiving cavities.

BACKGROUND

Track type machines typically utilize track chains on each side of the machine to engage the ground surface to propel the machine. Individual track links that form the track chains are connected to ground engaging elements, known as track shoes, to move the machine. These track links wear over time and may need to be replaced or serviced. A wear sensor may be placed in one or more of the track links to provide an indication of the wear of the respective track link. In placing a sensor in a track link, a material may be used to set, hold, and seal the sensor in the track link. However, the track link may include surface features that make it difficult to properly seal the material while the material sets, and thus the material may leak from the track link before it sets. Further, without a proper seal, the material may form an undesirable shape as the material sets (e.g., due to the leakage), and may not adequately hold and seal the sensor in place.

One such track link is disclosed in U.S. Pat. No. 9,475,526 ("the '526 patent") to McKinley et al., issued on Oct. 25, 2016. The track link of the '526 patent includes a wear sensing device that can be held in a cavity of the track link by a potting epoxy. However, the track link of the '526 patent may, in some instances, provide inadequate sealing of the cavity while the potting epoxy is cured.

The disclosed methods and systems may solve one or more of the problems set forth above and/or other problems in the art. The scope of the current disclosure, however, is defined by the attached claims, and not by the ability to solve any specific problem.

SUMMARY

In one aspect, a track link is disclosed. The track link includes: a link body; a cavity formed in the link body configured to receive a sensing device; and a protrusion substantially surrounding the cavity, the protrusion including a substantially flat surface.

In another aspect, a method of producing a track link is disclosed. The method includes: forming a general shape of a link body of the track link; forming a final shape the link body, the formed link body including a protrusion extending from a surface of the link body; forming a flat surface on the protrusion; and forming a cavity into the flat surface of the protrusion.

In yet another aspect, a track link is disclosed. The track link includes: a link body; at least one aperture in the link body configured to receive a track pin assembly; an indentation in the link body that extends substantially parallel to a longitudinal axis of the link body; a cavity formed in the link body configured to receive a sensing device; and a protrusion substantially surrounding the cavity, the protrusion including a substantially flat surface.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 3A and 3B are perspective views of the track link of FIG. 2 illustrating a sealing method, according to aspects of the present disclosure.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
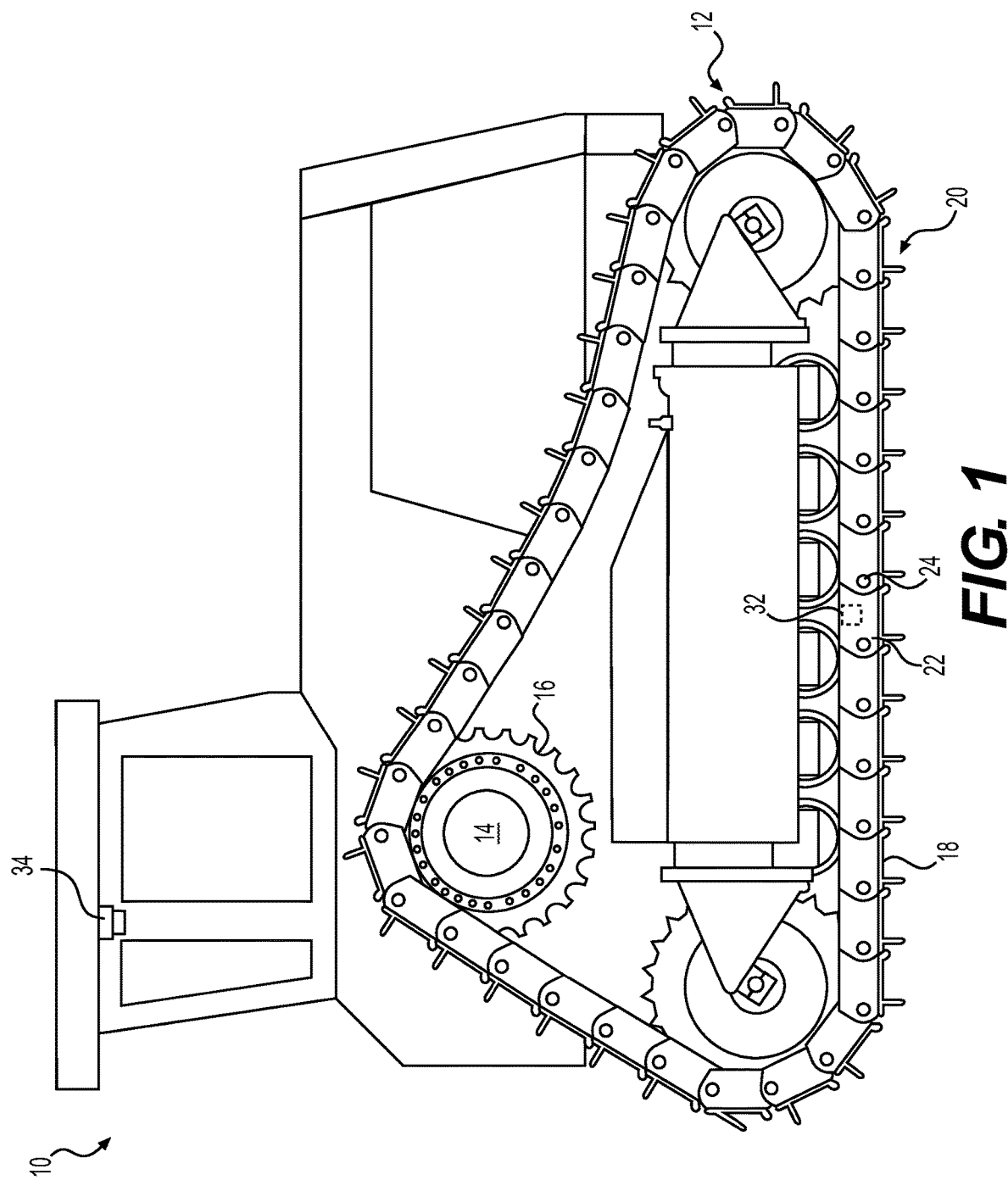
FIG. 1 is a schematic view of an exemplary track type machine having one or more track links, according to aspects of the present disclosure.

FIG. 1 illustrates a track type machine 10 according to the present disclosure. Machine 10 may embody any machine that is driven, propelled, positioned, and/or maneuvered by operating "continuous" track type traction device. Such machines may include, for example, track type tractors, skid steers, dozers, excavators, backhoes, track loaders, front shovels, rope shovels, or any other type of track-maneuverable machine. Machine 10 may include a pair of track assemblies 12 (only one shown) on opposing sides of machine 10 and driven by a driving mechanism 14, such as a machine engine or other power source (not shown) via at least one drive gear or sprocket 16. Each track assembly 12 may form separate endless loops. A plurality of track shoes 18 may be coupled to an outer surface of track assembly 12 in order to aid in the engagement of the ground surface. Track assembly 12 may include a plurality of other components that form the continuous track, ground-engaging portion of the drive system of machine 10. Track assembly 12 may be coupled to an undercarriage assembly 20 that includes, for example, sprocket 16, at least one idler, a plurality of rollers, and any other component of an undercarriage assembly known in the art.

Track assembly 12 may be a chain that includes multiple structurally similar link subassemblies, each of which may include a pair of track links. A pair of track links may include a track link 22 and a respectively paired track link (not shown in FIG. 2, which is a side view) that is parallel and spaced opposite from track link 22. In some embodiments, adjacent track links 22 may be coupled together via a plurality of pin assemblies 24. Each track link 22 may be engaged by teeth of sprocket 16 to drive track assembly 12 around undercarriage assembly 20.

As further shown in FIG. 1, machine 10 may include at least one sensing device 32 (illustrated by dashed lines in FIGS. 1 and 3A) and at least one communication device 34. Sensing device 32 may be an electronic device configured to detect a parameter of track assembly 12 and transmit a signal indicative of the parameter to communication device 34 and/or to a remote device. In the exemplary embodiment, sensing device 32 may be a wear sensor and may be configured to measure a parameter associated with an amount of wear experienced by a track link 22. As used herein, a "wear parameter" is a measurement or other characteristic of a monitored component or sensing device 32 that may indicate an amount of wear experienced by the monitored component (e.g., when compared to a previous measurement or other previous characteristic). Sensing device 32 may be mounted in a track link 22 (as shown in FIG. 3A) and configured to detect a wear parameter thereof. Sensing device 32 may be configured to detect a wear parameter associated with wear of at least one surface of a body of track link 22. For example, sensing device 32 may include a wear portion 33 positioned at a surface of track link 22 such that, as the surface wears away, the wear portion 33 of sensing device 32 also wears away. In some embodiments, sensing device 32 may use a depth sensor that uses ultrasonic waves, sound waves, lasers, etc. to determine a distance from sensing device 32 to a surface of track link 22. One or more track links 22 may include sensing device 32, as detailed further below.

Figure 2:
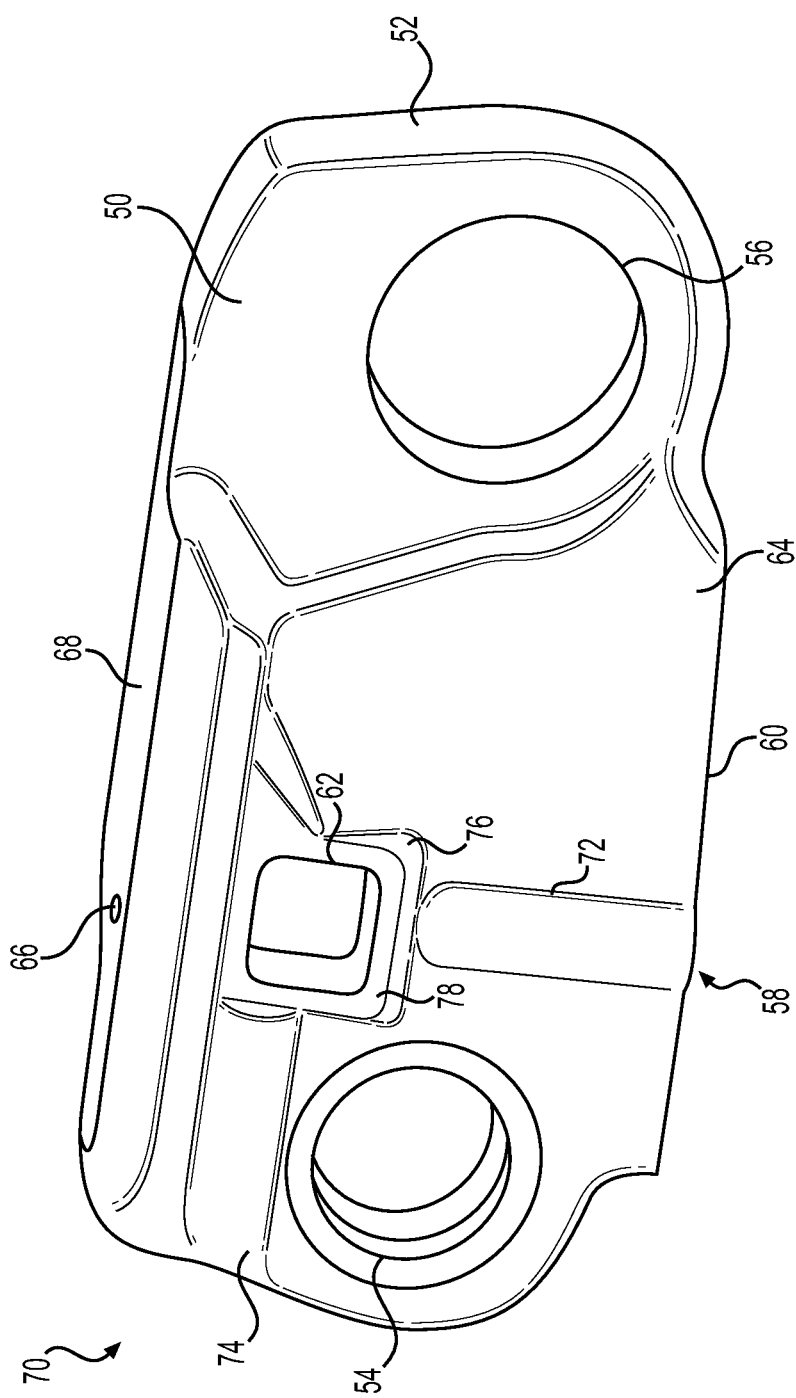
FIG. 2 is a perspective view of an exemplary track link isolated from the machine of FIG. 1.

FIG. 2 is a perspective view of an exemplary track link 22, according to aspects of the present disclosure. As shown in FIG. 2, track link 22 may include a link body 50 having an outer surface 52 that defines a perimeter of the link body 50, and thus defines a shape of track link 22. Track link 22 may include a height between 200-280 mm, a width between 80-200 mm, and a thickness between 50-150 mm. However, it is understood that track link 22 may include any size and/or shape, as desired. Track link 22 may include an outward-facing surface 64 and an inward-facing surface (not shown). Outward-facing surface 64 may face away from machine 10 and the inward-facing surface may face toward machine 10 when track assembly 12 is installed on machine 10. Each track link 22 may include one or more apertures 54, 56 configured to receive at least a portion of track pin assemblies 24 in a manner known in the art. In the exemplary embodiment, track link 22 includes a first aperture 54 and a second aperture 56 at respective opposite ends and/or spaced apart along a longitudinal axis of each track link 22. It is understood that track link 22 may include any number of apertures 54, 56 for receiving respective track pin assemblies 24.

Each track link 22 may also include one or more shoe holes 58 (unseen in FIG. 2 due to angle of perspective view) in a mounting surface 60 of link body 50. Shoe holes 58 may extend as through-holes into the link body 50 substantially along a vertical axis of track link 22. Track shoes 18 may be attached to track link 22 on mounting surface 60. For example, fasteners (e.g., threaded fasteners), such as bolts (not shown) or the like, may be disposed within shoe holes 58 to attach track shoes 18 to track link 22, and corresponding threaded fasteners, such as nuts or the like, may be disposed on the ends of the bolts.

Track link 22 also includes a cavity 62 formed in link body 50 (e.g., in a surface 64 of link body 50) and may be configured to receive sensing device 32, as detailed further below. Cavity 62 may include a size and shape to receive and accommodate at least a portion of sensing device 32. For example, cavity 62 may include a generally rectangular or square shape and may include a height of about 31 mm, a width of about 36 mm, and a depth of about 32 mm. However, it is understood that cavity 62 may include any size and/or shape, as desired. Cavity 62 may receive a containment material to secure the sensing device 32 in cavity 62, as detailed further below. In some embodiments, a passage 66 may be connected to cavity 62 and may be configured to receive a wear portion of sensing device 32. The passage 66 may extend from a surface 68 to cavity 62 such that the wear portion of sensing device 32 may wear away with surface 68. For example, surface 68 may be a wear surface and cavity 62 may be located adjacent surface 68. A wear surface may be any surface of link body 50 in which material wears away during use of track assembly 12. For example, material of surface 68 may be worn away through contact with components of undercarriage assembly 20 (e.g., the rollers) and/or other external materials (e.g., the ground). Thus, sensing device 32 may detect an amount of material that has been worn away from surface 68. As shown in FIG. 2, surface 68 may be generally flat to facilitate interaction with the components, such as the rollers, of undercarriage assembly 20. However, it is understood that surface 68 may include an uneven, non-flat surface, such as one or more curved surfaces or the like.

Track link 22 may include one or more surface features 70 on surface 64 of link body 50. As shown in FIGS. 2 and 3A-3B, the surface features may include one or more fastener protrusions 72, one or more indentations 74, and/or a cavity protrusion 76. As used here, a "protrusion" is a portion of track link 22 that is raised or proud with respect to surrounding surfaces (e.g., surface 64). The fastener protrusions 72 may extend from surface 64 and may be generally aligned with shoe holes 58. The fastener protrusions may provide additional support or structural integrity of shoe holes 58 for the fasteners. The one or more indentations 74 may include at least one indentation 74 that is substantially parallel with the longitudinal axis of track link 22. The indentation 74 may provide clearance of the track link 22 from components of undercarriage assembly 20 (e.g., clearance from flanges of the rollers when the track link 22 becomes worn). In some instances, the indentation 74 may extend substantially along the longitudinal axis of track link 22 and at least a portion of cavity 62 may be formed through a portion of indentation 74. As detailed above, it may be difficult to seal the cavity while the containment material is setting, drying, or otherwise solidifying due to the uneven surfaces provided by indentation 74. Thus, the track link 22 of the present disclosure may provide cavity protrusion 76 having a flat surface 78 to provide an improved sealing surface while the containment material sets.

Cavity protrusion 76 may extend from surface 64 and may substantially surround cavity 62. For example, cavity protrusion 76 may include additional material on track link 22 such that cavity 62 is formed through cavity protrusion 76, as detailed further below. At least a portion of protrusion 76 may extend from at least a portion of indentation 74 such that protrusion 76 interrupts indentation 74. At least a portion of protrusion 76 may also be located adjacent at least one fastener protrusion 72. In some embodiments, protrusion 76 may abut at least a portion of at least one fastener protrusion 72. As shown in FIGS. 2 and 3A-3B, protrusion 76 may extend from surface 64 at a greater height than the one or more fasteners protrusions 72. However, it is understood that protrusion 76 may extend from surface 64 at any height as desired, such as a height equal to, or less than, a height of the one or more fastener protrusions 72.

Protrusion 76 may include a continuous and uniform height around an entirety of cavity 62 such that protrusion 76 forms a uniform and continuous edge of cavity 62. For example, protrusion 76 may include a thickness (e.g., a height from surface 64) of about 10 mm, a width of about 40 mm, and a length of about 40 mm. The height, or thickness, of protrusion 76 from surface 64 may be formed and defined by flat surface 78. Flat surface 78 may provide a planar surface that interacts with a sealing device 80 such that a seal is formed while the containment material sets, as detailed below with respect to FIGS. 3A and 3B. For example, flat surface 78 may form a plane that may be spaced from a plane formed by surface 64. Flat surface 78 may be substantially normal to the edge surfaces (e.g., surface 68). However, it is understood that flat surface may be non-normal to the edge surfaces. Flat surface 78 may include a shape substantially similar to a shape of cavity 62. For example, the flat surface 78 may form a generally rectangular or square shape. However, it is understood that flat surface 78 of cavity protrusion 76 may include any size and/or shape, as desired.

Cavity 62 may extend into link body 50 from flat surface 78 of protrusion 76. For example, cavity 62 may include a blind hole such that cavity 62 extends into only a portion of link body 50 at a depth less than an entirety of the depth of link body 50. It is understood that cavity 62 may extend into link body 50 at any depth as desired, including extending through an entirety of link body 50 (e.g., from flat surface 78 through another surface of link body 50 opposite flat surface 78) so as to form an aperture.

INDUSTRIAL APPLICABILITY

The disclosed aspects of track link 22 may be employed in any machine that includes a tracked undercarriage that includes links coupled together to form one or more tracks. Cavity protrusion 76 of track link 22 described herein may provide flat surface 78 for providing an improved sealing surface during containment of sensing device 32. Cavity protrusion 76 may also provide additional material such that cavity 62 may include an adequate depth for receiving sensing device 32 and receiving the containment material.

FIGS. 3A and 3B illustrates a sealing method for sealing cavity 62 while the containment material sets, or otherwise solidifies. FIG. 3A illustrates placement of sensing device 32 in cavity 62. Sensing device 32 may be placed in cavity 62 and secured by the containment material. For example, sensing device 32 may rest against a rear surface (e.g., opposite an open portion) of cavity 62 and/or may rest against another surface of cavity 62. However, it is understood that sensing device 32 may be placed in cavity 62 so as to not contact any surface of cavity 62 and may be held in place by the containment material. The wear portion 33 of sensing device 32 may be inserted into passage 66 when sensing device 32 is placed in cavity 62. Thus, as detailed above, the wear portion 33 may be located at surface 68 such that the wear portion 33 wears when surface 68 wears. When the sensing device 32 has been placed in cavity 62 (e.g., and wear portion 33 is inserted into passage 66), containment material may be poured, injected, or otherwise placed in cavity 62 around sensing device 32 such that the containment material covers at least a portion of sensing device 32. The containment material may include, for example, a potting epoxy that may be poured and/or injected into cavity 62 with sensing device 32. After the containment material has been placed in cavity 62, sealing device 80 may be placed on flat surface 78 (as shown in FIG. 3B) while the containment material set, dries, and/or otherwise solidifies. For example, the potting epoxy may cure to form a solid material, thereby holding sensing device 32 in place. It is understood that while sensing device 32 is not shown in FIG. 3B (e.g., due to sealing device 80 covering cavity 62), sensing device 32 is contained in cavity 62 in the embodiment of FIG. 3B. As shown in FIG. 3A, the sealing device 80 may include a plunger device having a handle 82 extending between a first end and a second end, and a seal 84 located at the second end of the handle 82. Seal 84 may include an elastomer or other like material known in the art. The seal 84 may include a shape generally corresponding to a shape of cavity 62 (e.g., generally rectangular and/or square). A size of seal 84 may be generally larger than cavity 62. Thus, seal 84 may be placed on flat surface 78 such that seal 84 substantially covers cavity 62. In some embodiments, a portion of seal 84 may be inserted into a portion of cavity 62 when seal 84 is placed on flat surface 78. Seal 84 may also include an indentation 86 such that excess containment material may flow through indentation 86 when seal 84 is placed on flat surface 78. Accordingly, a portion of the containment material may flow onto flat surface 78 and as the containment material sets, the containment material may recede back towards cavity 62. Flat surface 78 may also provide ease of clean-up of the excess containment material that sets on the flat surface 78. It is understood that the sealing device 80 may include any sealing device known in the art that includes a seal 84 for being placed over cavity 62 to seal cavity 62 while the containment material sets. Further, it is understood that containment material may include any material having sufficient strength to hold sensing device 32 in place while also being capable of allowing signals to be transmitted there through (e.g., to allow sensing device 32 to communicate with communication device 34.

Figure 4:
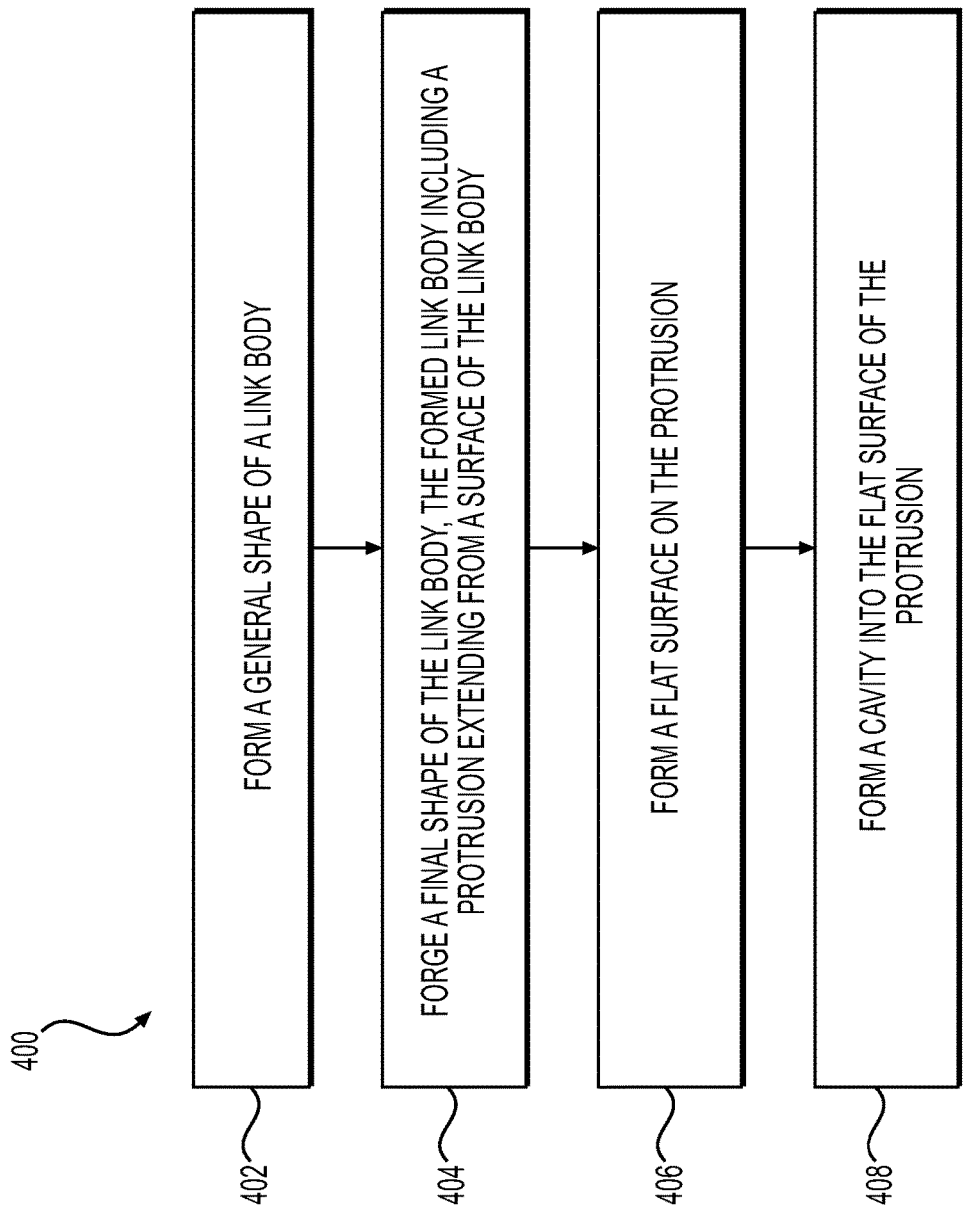
FIG. 4 is a flowchart illustrating a method of producing a track link of FIGS. 1 and 2.

FIG. 4 is a flowchart illustrating a method 400 of producing a track link 22 having a flat surface 78. A step 402 may include forming a general shape of link body 50 of the track link 22. Forming the general shape link body 50 may include heating raw material (e.g., steel) and forming the general shape of the link body 50 having an approximate shape and size of the final link body 50.

A step 404 may include forming a final shape of the link body 50. For example, the final shape of link body 50 may be formed by forging. The formed link body 50 includes a protrusion 76 extending from a surface 64 of the link body 50. The forging may include die forging that includes one or more dies and/or hammer-type machines. For example, the forging may include open-die forging in which one die is used to shape the link body 50, or may include closed-die forging in which two dies (e.g., a top die and a bottom die) are used to shape the link body 50. The shape of the forging may be incorporated into the dies as a negative image such that the impact of the dies on the heated raw material forms the raw material into the forged shape of the link body 50. In the exemplary embodiment, the dies may include a shape that includes the shape of the protrusion 76 such that the protrusion 76 is formed by the forging of the link body 50. In some embodiments, the sensing device 32 may be placed in a single track link 22 (e.g., and/or in less than an entirety of the track links 22) of the track assembly 12 and the dies for forging the track links 22 having a sensing device 32 may be different than the dies for forging the track links 22 that do not have a sensing device 32. For example, the dies for forging track links 22 having a sensing device 32 may include the shape of the protrusion 76, while the dies for forging track links 22 that do not have a sensing device 32 may not include the shape of the protrusion 76. Thus, less material may be used in forging track links 22 that do not have a sensing device 32. However, it is understood that an entirety of the track links 22 of track assembly 12 may include protrusion 76 regardless of whether a respective track link 22 includes sensing device 32.

A step 406 may include forming a flat surface 78 on protrusion 76. Forming the flat surface 78 may include forging the flat surface 78 as the link body 50 is forged (e.g., the dies may include a shape of the protrusion 76 and flat surface 78). Forming the flat surface 78 may also include machining the flat surface 78 on protrusion 76 after link body 50 has been forged. For example, material of protrusion 76 may be removed to form flat surface 78. In some embodiments, flat surface 78 may be formed by a combination of forging and machining.

A step 408 may include forming a cavity 62 into the flat surface 78 of protrusion 76. For example, material of link body 50 at protrusion 76 may be removed to form cavity 62 by machining. Passage 66 may also be formed during the forming of cavity 62. In some embodiments, flat surface 78 may be formed after cavity 62 has been formed. For example, after link body 50 has been forged, cavity 62 may be formed and then flat surface 78 may be formed around cavity 62 on protrusion 76.

It will be apparent to those skilled in the art that various modifications and variations can be made to the disclosed method and system without departing from the scope of the disclosure. Other embodiments of the method and system will be apparent to those skilled in the art from consideration of the specification and practice of the systems disclosed herein. It is intended that the specification and examples be considered as exemplary only, with a true scope of the disclosure being indicated by the following claims and their equivalents.

What is claimed is:

1. A track link, comprising:
    a link body;
    a cavity formed in the link body configured to receive a sensing device; and
    a protrusion substantially surrounding the cavity, the protrusion including a substantially flat surface.

2. The track link of claim 1, wherein a shape of the substantially flat surface is substantially similar to a shape of the cavity.

3. The track link of claim 2, wherein the shape of the substantially flat surface and the shape of the cavity are generally rectangular.

4. The track link of claim 1, further including an indentation in the link body that extends substantially parallel to a longitudinal axis of the link body.

5. The track link of claim 4, wherein the protrusion includes additional material extending from a surface of the link body, and at least a portion of the protrusion extends from a portion of the indentation.

6. The track link of claim 1, further including at least one aperture in the link body configured to receive a track pin assembly.

7. The track link of claim 1, wherein the link body and the protrusion are formed by forging.

8. The track link of claim 7, wherein the substantially flat surface is formed by machining.

9. A method of producing a track link, comprising:
    forming a general shape of a link body of the track link;
    forming a final shape of the link body, the formed link body including a protrusion extending from a surface of the link body;
    forming a flat surface on the protrusion;
    forming a cavity into the flat surface of the protrusion; and
    positioning and sealing a sensor within the cavity.

10. The method of claim 9, wherein forming the general shape of the link body includes heating raw material and forming the general shape of the link body in the heated raw material.

11. The method of claim 9, wherein the forming the final shape of the link body includes one or more dies having a shape of the link body.

12. The method of claim 11, wherein the one or more dies includes a shape of the protrusion.

13. The method of claim 9, wherein forming the flat surface includes forging the flat surface.

14. The method of claim 9, where forming the flat surface includes machining the flat surface.

15. The method of claim 9, wherein forming the cavity includes machining the cavity.

16. A track link, comprising:
    a link body;
    at least one aperture in the link body configured to receive a track pin assembly;
    an indentation in the link body that extends substantially parallel to a longitudinal axis of the link body;
    a cavity formed in the link body configured to receive a sensing device; and
    a protrusion substantially surrounding the cavity, the protrusion including a substantially flat surface.

17. The track link of claim 16, wherein a shape of the substantially flat surface is substantially similar to a shape of the cavity.

18. The track link of claim 17, wherein the protrusion includes additional material extending from a surface of the link body, and at least a portion of the protrusion extends from a portion of the indentation.

19. The track link of claim 16, wherein the link body and the protrusion are formed by forging.

20. The track link of claim 19, wherein the substantially flat surface is formed by machining.

* * * * *